Patented Nov. 26, 1946

2,411,793

UNITED STATES PATENT OFFICE 2,411,793

TREATMENT OF OIL AND GAS WELLS

Harvey T. Kennedy, Oakmont, Pa., and Paul L. Gassett, Flora, Ill., assignors to Gulf Research & Development Company, Pittsburgh, Pa., a corporation of Delaware No Drawing. Application September 17, 1942, Serial No. 458,720

10 Claims. (Cl. 166—22)

This invention relates to treatment of oil and gas wells; and it comprises a method of treating wells producing both hydrocarbons and water from the same horizon of the adjacent formations wherein there is established a body of pumpable plastic having a definite yield point high enough to prevent the plastic from penetrating earth formations until subjected to a minimum differential pressure, said plastic being adapted to harden in time to a frangible solid under bottom-hole conditions, the plastic body so established is introduced into the well, directed against the faces of the hydrocarbon and water-producing horizon, subjected to a pressure in excess of the minimum required to cause the plastic to flow into the formation and the pressure maintained until the plastic thus injected into the formation has had time to harden; all as more fully hereinafter set forth and as claimed.

There have recently come into use procedures for sealing permeable non-productive formations in oil wells, involving injection into the pores of the rock of a penetrating liquid material of such character as to set up, in the course of time, as a water-resistant mass in the pores. Among the best known agents for this purpose are acid silica sols, in a state of incipient gelation, such as produced by mixing together sodium silicate and an acid, or by mixing certain organic silicon compounds and water.

Liquid resins adapted to solidify by polymerization have also been used as such penetrating sealing agents.

It has been found in practice that when non-plastic penetrating sealing agents, such as the liquid silica sols and liquid resins described, are forced indiscriminately into the permeable formations surrounding a well, there is no selective action of the sealing agent; both water and oil production are diminished. Various methods of different degrees of practicability have been proposed for bringing about a selective penetration of the sealing agent into the non-productive rock.

The present invention is based on the discovery that a selective sealing action is obtained by employment of a plastic of predetermined properties as the penetrating sealing agent; the ratio of water to oil produced is diminished. In many cases through the benefit of selective sealing action, the oil-producing capacity of the well can be increased with the existing pumping equipment, since in shutting off some or all of the water, the static back pressure can be greatly reduced by pumping down the well.

The plastic sealing agents, use of which is contemplated in the present invention, are characterized by having a finite value of shearing stress below which no appreciable deformation of the plastic takes place. A true liquid is deformable by applied shearing stress no matter how small; thus, it will penetrate the finest pored formations under the slightest pressure differential.

The sealing agents of the present invention are further characterized by the property of setting up to frangible solids which, when left in the well, may be removed by bailing, thus avoiding the great trouble and expense involved if materials which set up to rock-like hardness are employed. In certain slurry weights, cement grout has plastic properties similar to those of the plastics within the purview of the present invention, but the use of such grouts is relatively prohibitive because the excess cement left in the hole after treatment must be removed with drilling tools. It cannot be bailed out. Silica sols and resin forming fluids are transformed into frangible solids; cement is transformed into an infrangible solid.

In the process of the present invention, the yield point of the plastic agents employed is fixed at a value such that under the operating pressures employed the agent will not penetrate the smaller pores of the horizon treated but will penetrate channels and loose streaks which frequently are the source of water influx. The yield point is kept low enough to permit ready penetration of these channels and streaks without application of unreasonably high working pressures.

In general, preparation of a sealing agent having the desired properties is accomplished by establishing a body of liquid penetrating sealing agent of a type frangible when set, such, for example, as a liquid silica sol or a liquid resin, after which such liquid can be modified when necessary to give it plastic properties. Ordinarily, to render the liquid plastic we incorporate therein a suitable colloidal jellifying agent. For example, in one of the best embodiments of the invention, the plastic sealing agent is prepared by establishing a liquid acid silica sol in a state of incipient gelation, after which the sol is plasticized by adding thereto gum karaya in amount adjusted to form a pumpable colloidal gel capable of penetrating rock pores when injected under differential pressure high enough to exceed the yield point of the gel so formed.

Some of the liquid sealing agents of the prior art pass through a plastic stage during their transformation into solids. In some instances, we are able to establish a body of liquid sealing agent, allow it to go through that stage of transformation which renders it plastic and delay further transformation long enough to enable use of the plastic without the addition of colloidal jellifying material thereto.

As above stated, the plastic treating agents of the present invention have a finite value of shearing stress below which substantial deformation of the plastic does not take place no matter how long the application of stress is continued. In consequence of this property, inherent in all plastics, when the treating agents of the present invention are introduced into the bottom of a well, no flow will take place into the adjacent formations until a stress is applied to the body of treating agent in excess of the shearing stress required to exceed the yield point. The applied stress required to force the plastic into the formation is roughly inversely proportional to the size of the pore openings in the formation. Thus, when a body of plastic is at rest in the bottom of a well and in contact with adjacent formations of varying pore sizes, if the stress applied to the plastic is gradually increased, the initial flow of the plastic will take place into the largest pores or channels and all the flow will take place through these pores until the stress is increased to such a value that the finite value of resistance to flow into the next smallest size pore is overcome. In the practice of the invention, this behavior of the plastic treating agent is utilized to inject the treating agent into the pores of largest size selectively.

The pressures required for the injection of our plastic sealing agents vary widely, depending upon the coarseness of the formation pores and the yield point of the plastic material used in the treatment. Ordinarily, we adjust the yield point of the plastic sealing agent employed so that pressures are convenient to measure and at the same time are within the range of pumping equipment employed. Ordinarily, pumping pressures in the neighborhood of 500 to 1,000 pounds per square inch are suitable, but pressures up to 3,000 or 4,000 pounds per square inch are at times employed. With the plastic materials of the class described, ordinarily no appreciable volume of injection results until a fairly definite minimum pressure is reached. In applying our process, it is desirable that the pressures employed do not greatly exceed the minimum at which injection can be accomplished. Otherwise, there is danger that both water and oil production may be substantially curtailed.

The tabulation below shows the effect of karaya and other gums in preparing suitable plastics from a typical good sealing sol, made by adding two volumes of N-brand sodium silicate solution of specific gravity 1.165, to one volume of H₂SO₄, specific gravity 1.165, with violent agitation. The gum is added gradually to the sol and the mixture is stirred vigorously for 10 to 30 minutes, after which the tests are made, described in detail below. The quantities of gum are expressed as per cent by weight on the sol plus gum. With these plastic gum gels no filter cake built up and the water loss was negligible. The gel strength was within the desired range.

| Gum used | Viscosity, centipoises | 10 min. gel strength | Filtrate 5-15 minutes, ml. | Cake thickness, mm. |
|---|---|---|---|---|
| 2% karaya | 58 | 9.1 | 0.8 | 0 |
| 3% karaya | 157 | 20.1 | 0.6 | 0 |
| 3% tragacanth | 193 | 6.5 | 0.5 | 0 |
| 7% ghatti | 122 | 5.7 | 0.25 | 0.1 |
| 8% fibergel | 161 | 12.0 | 0.5 | 1.0 |
| 10% fibergel | 300 | 45.9 | 0.4 | 1.0 |
| 15% arabic | 68 | 5.2 | 0.5 | 0.5 |

In testing the plastic gels for tendency to bleed, they were pumped under a pressure of 100 pounds per square inch against a porous filter paper of effective area 22.5 square cm., suitably supported. This apparatus is a "Baroid high-pressure wall building tester." The volume of liquid which passes through the paper is taken as a measure of the stability of the plastic gel. The volume of liquid collected after 15 minutes, less the volume collected after 5 minutes' test, is a suitable measure of the liquid loss of the materials into a fine-grained formation. The corresponding build-up of a cake on the paper is also noted under "cake thickness."

As a measure of the yield point, or gel strength, it is convenient to use the 10-minute gel strength as determined on drilling muds on the Stormer viscometer. This test is made as follows: The material under test is poured into the bowl of a Stormer viscometer, and the rotating drum inserted in place as in making a regular viscosity measurement. The material is then allowed to stand for 10 minutes, care being taken to avoid vibration or other disturbance. At the end of the 10 minutes, a light basket is attached to the cord which normally carries the driving weights, and lead shot is poured slowly into the basket until the drum starts to rotate. The weight in grams required to cause the drum to rotate is taken as the 10-minute gel strength of the plastic material under test. We have found that the yield point or gel strength, as measured by this test, is roughly proportional to the pressure required to force flow of the plastic material into a given formation.

It is important that the liquid loss, as described, be kept to a minimum in order to avoid filtering out suspended material at the face of the earth formations. In other words, the plastic gels employed should have good stability and little tendency to bleed under operating pressures. In some cases, such as fairly coarse limestone pays, moderately low stability can be tolerated since very low pressures suffice to inject the plastic into the desired formations. In other cases, particularly those where fine-grained sands are involved, low liquid loss characteristics are essential in order to avoid plugging the pay channels.

Bentonite may be used as a substitute for gums to plasticize the liquid sols; but the gels formed with bentonite are less stable and their yield points are relatively low. The stability of gels used in the process of the present invention should be such that they will not break down or "bleed" under pressures less than those required for the injection of the gel into the formation. Thus, for treatment of relatively tight formations, we generally prefer to use a plasticizer yielding a gel of higher stability than is afforded by the use of bentonite. This avoids the danger of having the gel break down and having sealing liquid leak into the oil-producing pores.

Examples of the manner in which our process may be employed are described in the following:

*Example 1.*—In this case it was known that the oil and water-producing horizon to be treated was a dolomite formation of high producing capacity. The well was making 8 barrels of oil and 425 barrels of water at the producing horizon, the liquid production representing the capacity of the pump rather than the pumped-down capacity of the well. A silica sol consisting of two parts of sodium silicate, specific gravity 1.165, added with vigorous agitation to one part of sulphuric acid solution, specific gravity 1.165, was prepared. To 300 gallons of this liquid mixture were added 730 pounds of bentonite, making a suspension of bentonite in the silica sol of 20 per cent by weight. This plastic mixture was then pumped through tubing to the bottom of the well, a packer having previously been set just above the producing horizon so that the treating agent was directed against the faces of the oil and water-producing horizon. The silica sol and bentonite suspension was followed by water and pressure applied to force the suspension into the formation, which required an initial surface pressure of 500 pounds per square inch. After injection was started, the pressure was maintained at a maximum of 600 pounds per square inch during the injection. The well was then allowed to stand for 24 hours to allow the sealing agent to set. After the packer was removed, the well bailed out, and put back on production, it was found that the water had decreased to 36 barrels per day, while the oil had increased to 34 barrels. The pumped-down capacity of the well was decreased substantially by the treatment, and the increase in oil flow resulted from the greater pressure differential between the formation and the well.

*Example 2.*—The pay formation in this case was a sandstone, which consisted largely of fine sandstone with occasional loose streaks which carried large volumes of water into the well along with the oil. For the treatment of this well, a silica sol was prepared as described in Example 1, but instead of using bentonite, the sol was thickened by the addition of 3 per cent of gum karaya. This gave a mixture of the following characteristics:

Stormer viscosity _____ centipoises__ 157
10-minute gel strength _____ grams__ 20.1
Liquid loss (10-min. interval) __milliliters__ 0.6

After thoroughly dispersing the gum in the silica sol, the mixture was pumped into the well and injected into the formation at the producing horizon under a packer, the packer being set at the top of the producing sand. The production before treatment was 18 barrels of oil and 274 barrels of water, which was changed by the treatment to 18 barrels of oil and 14 barrels of water.

*Example 3.*—A mixture was prepared as follows: one gallon of concentrated hydrochloric acid and 12.5 gallons of 90 per cent denatured alcohol were mixed with 50 gallons of neat ester ethyl silicate. In another container, 21 pounds of tetraphosphoric acid and 7.5 gallons of concentrated hydrochloric acid were mixed with 50 gallons of water. This mixture was added in small proportions with constant stirring to the above mixture until the entire fluid was clear. The balance of the 50 gallons of acidulated water was then added, followed by 77 gallons of fresh water. The procedure yielded 200 gallons of silica sol of high potential strength. To the 200-gallon batch of sol were added 50 pounds of gum tragacanth, the resulting plastic mixture having the following properties:

Stormer viscosity _____ centipoises__ 193
10-minute gel strength _____ grams__ 6.5
Water loss _____ milliliter__ 0.5

This plastic was pumped into a well of the same type as described in Example 2 and substantially similar results obtained.

In place of bentonite, karaya or tragacanth, gum arabic may be used as a plasticizer for the liquid sol; but considerably greater quantities of it are required than for the other gums, about 15 per cent of gum arabic being comparable to 2 per cent of gum karaya. Comparative data on the various gums are shown in the tabulation above. In some cases foaming is induced by the addition of gums to silica sols. However, this trouble may be eliminated by the addition of 1 or 2 per cent of alcohol, such as iso-butyl, isopropyl or ordinary denatured alcohol.

In carrying out our method, it is sometimes convenient to perform a preliminary blank test in the well to ascertain the necessary plastic properties. If the gel has too high a yield point, it will not enter the rock pores which it is desired to seal; if the yield point is too low, both oil- and water-producing formations may become obstructed. Accordingly, there is prepared a plastic from a gum and water of rather high yield point, and it is injected into the well in the same manner as that used in the sealing step. If the plastic cannot be injected with the equipment available, this indicates that the plastic gel is of too high yield point. Then the gel is bailed out and a gel of lower yield point is tried out. If the injection pressure is moderate, say in the range 500 to 1000 pounds per square inch differential and the gel flows into the formation, a similar gel is made up with a sealing sol and is injected in the usual way.

In a specific example illustrative of this mode of practicing the invention, a well was to be treated which in its early life produced oil associated with water in a fairly constant, moderate ratio but later began to produce water in ever increasing quantities. A plastic gel was made up from gum karaya and water, of yield point 25 grams, and was injected into the well in a conventional manner. Injection pressures determined at the surface were inordinately high, and no plastic to speak of went into the formations. The gel was bailed out and diluted to bring its yield point to 16 grams, and injected again. The surface injection pressure was 800 pounds per square inch, and the gel flowed slowly into the formations. Injection was stopped and excess gel was bailed out.

A quantity of a sealing sol was made up by mixing together equal volumes of a methyl silicate and water, containing a little HCl. Two per cent by weight of gum karaya was incorporated with vigorous agitation, and stirring was continued for ten minutes, producing a gel of yield point 10 grams. The gel was injected into the well in the usual way, the pressure being around 800 pounds per square inch. Pressure was maintained for several hours to give the silica sol constituent of the gel time to set. Pressure was then released, the well bailed and production resumed. The oil-water ratio was considerably bettered.

As illustrative of that mode of practicing the invention wherein the addition of a plasticizer to the sealing agent is omitted, preliminary tests were performed upon the well formation to be treated indicating that a plastic of yield point about 30 grams would have desirable injection characteristics when injected under an applied pressure of about 1100 pounds per square inch. Accordingly, to 175 gallons of unpolymerized monomeric vinylidene chloride which had been previously stabilized by the addition of iodine thereto, there was added sufficient aqueous alkali to extract the iodine, and the mixture was agitated, after which the aqueous extract was removed. The separated monomeric vinylidene chloride was then warmed to accelerate polymerization. The liquid vinylidene chloride gradually increased in plasticity while undergoing polymerization. Periodic tests were performed on samples of the warmed body until it was observed that the yield point was about 25 grams at which time the body of partially polymerized plastic was introduced into the well bore, followed by a column of water. Pressure was applied to the loading column until the surface gage indicated a pressure of 1000 pounds per square inch, when moderate flow into the formation commenced to take place as indicated by the flow of liquid from the surface. The pressure was increased to 1050 pounds per square inch and the flow gaged until it was determined that the bulk of the plastic had been displaced into the adjacent formations, after which the pressure was relieved sufficiently to halt further injection and there maintained for 10 hours, after which the pressure was relieved, the well pumped down and then the bore cleaned out by bailing. When placed on production, the water-oil ratio was improved.

In a similar manner, there may be employed any of the numerous liquid substances which undergo gradual polymerization, first passing through a plastic state and later turning solid or increasing in plasticity to such an extent as to plug successfully earth formations when injected therein. Known polymerization inhibitors and accelerators may be employed to control the degree and rate of polymerization within the desired limits. Thus, unpolymerized styrene may be allowed to polymerize partially until the desired plasticity is obtained and the plastic thus formed injected into the formations under conditions such that further polymerization will take place in the formations.

Whenever we have used the term "frangible" herein and in the appended claims, we mean to signify such fragility as will enable a solid in an open well to be disintegrated and removed by the action of a bailer.

What we claim is:

1. A method of treating a well producing both hydrocarbons and water which comprises establishing a body of pumpable plastic having a definite yield point high enough to prevent it from penetrating the formations until subjected to a minimum applied differential pressure sufficient to exceed its yield point at the larger pored formations and which will cause its flow, selectively, into the larger pores of the formations, said plastic being adapted to harden in time to a frangible solid under bottom-hole conditions, introducing the plastic body so established into the well, directing the plastic body against the faces of the producing horizon and subjecting the plastic body to a pressure in excess of the minimum required to cause its flow into the larger pores of the formations, but insufficient to force it into the smaller pores thereof.

2. A method according to claim 1 wherein the pressure to which the plastic body is subjected is maintained at a value only slightly in excess of that required to cause flow thereof into the formations.

3. A method according to claim 1 wherein said plastic is a silica sol in an incipient state of gelation containing a colloidal jellifying agent.

4. A method according to claim 1 wherein said plastic is a silica sol in an incipient state of gelation containing bentonite.

5. A method according to claim 1 wherein said plastic is a partially polymerized resin-forming fluid.

6. A method of reducing the water-oil ratio in wells producing hydrocarbons and water which comprises preparing a plastic gel of known yield point from water and a gum, testing the injection characteristics of the formation to be treated by attempting to inject the gum and water sol therein under measured pressure, repeating the test with water and gum gels of different yield points until a yield point is found permitting the gel to be slowly injected into the formation under the available pressure and thereafter injecting into the formation under said pressure a pumpable plastic having substantially the same yield point, said plastic being adapted to harden in time to a frangible solid under bottom hole conditions and maintaining the pressure on said plastic thus injected into the formation until it has had time to harden.

7. A method of preferentially sealing coarse pored formations, in wells producing oil or gas and water, while leaving fine pored formations relatively unsealed, which comprises injecting into the well under pressure a settable, fluid silica sol containing a gum dispersed therein in amount such as to render the sol too plastic to flow into fine pores but sufficiently fluid to flow into coarse pores, under said applied pressure, holding the pressure until the sol sets to a gel and removing set gel from the bore.

8. A method of selectively plugging formations in wells which comprises the steps of introducing into the formation to be plugged a body of pumpable plastic having a definite yield point high enough to prevent it from penetrating the formation until subjected to a minimum applied differential pressure, said plastic comprising a mixture of silica sol in an incipient state of gelation modified by the incorporation therein of between two and three per cent by weight gum karaya, subjecting the plastic body to a pressure in excess of the minimum to cause flow thereof into the more pervious formations but insufficient to force it into the smaller pores, allowing the mixture to solidify when in place to form a frangible mass, and finally bailing out excess plastic from the well.

9. A method of treating a well producing both hydrocarbons and water, which comprises establishing a body of pumpable plastic having a definite yield point high enough to prevent it from penetrating the exposed formations until subjected to a minimum applied differential pressure which will cause its flow, selectively, into the larger pores of the formations, said plastic comprising a silica sol in an incipient state of gelation containing a gum, and being adapted to harden in time to a frangible solid under bottom hole conditions, introducing the plastic body so established into the well, directing the plastic body against the faces of the producing horizon, and subjecting the plastic body to a pressure in excess of the minimum required to cause its flow into the larger pores of the formations, but insufficient to force it into the smaller pores thereof.

10. A method of treating a well producing both hydrocarbons and water, which comprises establishing a pumpable plastic having a definite yield point high enough to prevent it from penetrating the exposed formations until subjected to a minimum applied differential pressure which will cause its flow, selectively, into the larger pores of the formations, said plastic comprising a silica sol in an incipient state of gelation modified by the incorporation therein of between 2 and 3 per cent by weight of gum karaya and being adapted to harden in time to a frangible solid under bottom hole conditions, introducing the plastic body so established into the well, directing the plastic body against the faces of the producing horizon, and subjecting the plastic body to a pressure in excess of the minimum required to cause its flow into the larger pores of the formations, but insufficient to force it into the smaller pores thereof.

HARVEY T. KENNEDY.
PAUL L. GASSETT.